(12) United States Patent
Saunders

(10) Patent No.: US 6,202,924 B1
(45) Date of Patent: Mar. 20, 2001

(54) METHOD OF AUTHENTICATING AN APPLICATION PROGRAM AND A SYSTEM THEREFOR

(75) Inventor: Keith A. Saunders, Dundee (GB)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 09/276,979

(22) Filed: Mar. 26, 1999

(30) Foreign Application Priority Data

Nov. 23, 1995 (GB) .................................................. 9523922

(51) Int. Cl.[7] ...................................................... G06F 17/60
(52) U.S. Cl. .......................... 235/379; 235/380; 235/382; 902/14
(58) Field of Search .................................... 235/379, 380, 235/382, 382.5, 487, 492; 902/4, 5, 8, 14

(56) References Cited

U.S. PATENT DOCUMENTS

| | | |
|---|---|---|
| 4,471,216 | 9/1984 | Herve . |
| 4,544,833 | 10/1985 | Ugon . |
| 4,575,621 | 3/1986 | Dreifus . |
| 4,590,365 | 5/1986 | Okada . |
| 4,623,782 | 11/1986 | Faber . |
| 4,709,137 | 11/1987 | Yoshida ................................. 235/379 |
| 5,191,608 | 3/1993 | Geronimi . |
| 5,341,290 | 8/1994 | Lu . |
| 5,442,645 | 8/1995 | Ugon et al. . |
| 5,619,558 | 4/1997 | Jhetta . |
| 5,648,648 | 7/1997 | Chou et al. . |
| 5,917,421 | * | 6/1999 | Saunders ................................. 235/379 |

FOREIGN PATENT DOCUMENTS 0644511   3/1995  (EP) .

OTHER PUBLICATIONS

George I. Davida et al., "Defending Systems Against Viruses Through Cryptographic Authentication", Proceedings of the Symposium on Security and Privacy, US, Washington, IEEE Comp. Soc. Press, vol. –, pp. 312–318.

* cited by examiner

Primary Examiner—Karl D. Frech
Assistant Examiner—Daniel St. Cyr
(74) Attorney, Agent, or Firm—Michael Chan

(57) ABSTRACT

An unattended system, such as a self-service terminal or an automated teller machine, includes a memory unit which stores a number of application programs, and a register unit which stores a number of signatures associated with the application programs. The system further includes a processing unit which obtains a signature associated with a particular application program, compares the signature with the signatures stored in the register unit, and authenticates the application program only when the signature matches at least one of the signatures stored in the register unit.

8 Claims, 4 Drawing Sheets

METHOD OF AUTHENTICATING AN APPLICATION PROGRAM AND A SYSTEM THEREFOR

BACKGROUND OF THE INVENTION

The present invention relates to authenticating application programs, and is particularly directed to a method of authenticating an application program for use in an unattended system such as at a self-service terminal (SST) or an automated teller machine (ATM).

A typical authentication scheme to authenticate a user in an unattended system having a number of installed application programs relies upon the user having some secret knowledge (such as a personal identification number) to allow the user to gain access to valuable system resources of the unattended system. While this authentication scheme may provide adequate security in an attended system, such an authentication scheme may not provide the level of security desired in an unattended system, such as at a SST or ATM. The level of security desired may not be provided by the known authentication scheme because it is still possible to introduce an altered and/or fraudulent application program into the SST or ATM without subsequent users knowing the application program has been altered and/or is fraudulent.

SUMMARY OF THE INVENTION

In accordance with one aspect of the present invention, a method of authenticating an executable application program installed in an unattended system in response to a transactional request from a user of the unattended system requiring execution of the application program comprises the steps of accepting the transactional request from the user of the unattended system, obtaining a signature associated with the application program, comparing the signature with a number of signatures stored in a look-up table to determine if the signature matches one of the signatures stored in the look-up table, and authenticating the application program only when a match occurs.

In accordance with another aspect of the present invention, an unattended system comprises a memory unit for storing an executable application program and a processing unit for executing the application program stored in the memory unit. A user interface provided for accepting a transactional request from a user of the unattended system that the application program stored in the memory unit be executed by the processing unit. A register unit is provided for storing a number of signatures associated with a number of executable application programs. The processing unit includes (i) means for obtaining a signature associated with the application program, (ii) means for comparing the signature associated with the application program with the signatures stored in the register unit, and (iii) means for authenticating the application program only when the signature associated with application program matches at least one of the signatures stored in the register unit.

Preferably, the user interface comprises a front panel of an automated teller machine (ATM). The front panel of the ATM includes (i) a card reader having a card slot through which a user identifying card of an ATM customer can be received and (ii) a key pad for inputting data after the user identifying card has been inserted into the card slot, read by the card reader, and verified by the processing unit. The memory unit and the register unit comprise separate storage media.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein.

DETAILS OF THE INVENTION

Figure 1:
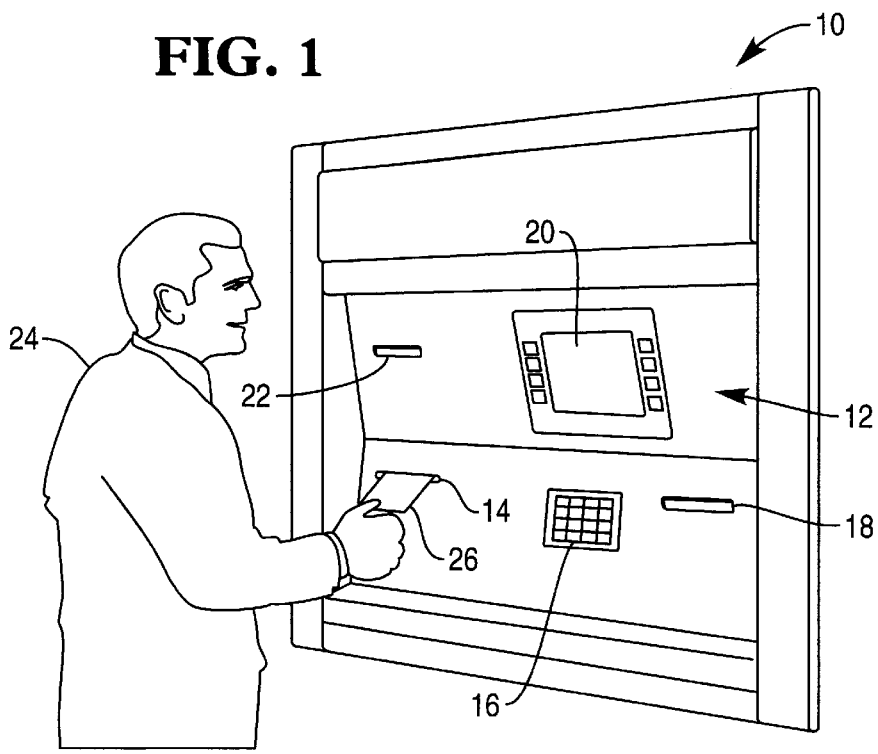
FIG. 1 is a schematic view illustrating an automated teller machine (ATM) embodying the present invention.

The present invention is directed to a method of authenticating an application program to enable the application program to gain access to valuable system resources in response to a user request which requires execution of the application program. While the method of authenticating an application program in accordance with the present invention may be applied in different environments, the method is particularly useful for authenticating an application program which is installed in an unattended system, such as at a self-service terminal (SST) or an automated teller machine (ATM). By way of example, an ATM 10 embodying the present invention is illustrated in FIG. 1.

The ATM 10 comprises a user interface in the form of a front panel 12. The front panel 12 includes a card reader 14, a key pad 16, a cash dispenser 18, a CRT display screen 20, and a receipt printer 22. The card reader 14 has a card slot through which a customer 24 can insert a user identifying card 26 at the commencement of a transaction to be conducted by the customer 24. The cash dispenser 18 has a cash slot through which cash currency notes stored inside the ATM 10 can be delivered to the customer 24 during the transaction. The receipt printer 22 has a receipt slot through which a receipt of the transaction is delivered to the customer 24 at termination of the transaction.

When the customer 24 inserts the user identifying card 26 into the card slot of the card reader 14, the card reader reads data contained on the card. The customer 24 is then prompted on the CRT display screen 20 to enter a personal identification number (PIN) via the key pad 16. After the correct PIN is entered, menus are displayed on the display screen 20 to enable the customer 24 to carry out the desired transaction. After the transaction is completed, the receipt printer 22 prints a receipt of the transaction and delivers the receipt through the slot of the receipt printer 22 to the customer 24.

Figure 2:
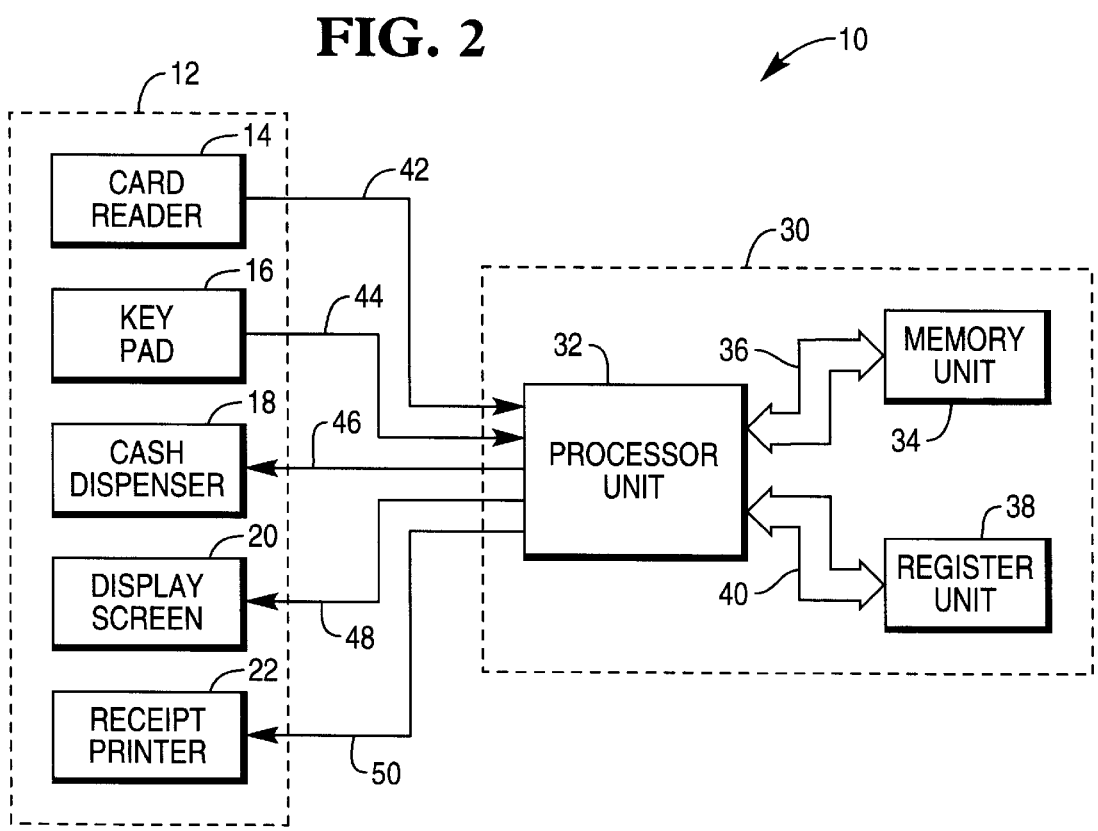
FIG. 2 is a block diagram representation of the ATM of FIG. 1.

Referring to FIGS. 1 and 2, the ATM 10 further comprises a controller unit 30 which communicates with components of the front panel 12. The controller unit 30 includes a processor unit 32, a memory unit 34 connected via bus line 36 to the processor 32, and a register unit 38 which is connected via bus line 40 to the processor 32. The register unit 38 is a permanent storage media such as a hard disk or non-volatile RAM, for example. Although the memory unit 34 and the register unit 38 are shown as separate units in FIG. 2, it is contemplated that these units may be represented as a single storage unit. The processor 32 receives input signals on lines 42, 44 from the card reader 14 and the key pad 16, respectively, and provides output signals on lines 46, 48, 50 to the cash dispenser 18, the display screen 20, and the receipt printer 22, respectively, to control the amount of cash dispensed by the cash dispensed by the cash dispenser 18, the information displayed on the display screen 20, and the information printed by the receipt printer 22.

A number of application programs are stored in the memory unit 34. The specific application programs stored in the memory unit 34 depend upon the features and capabilities of the particular ATM 10. At least some of the application programs, when executed, control operation of valuable system resources like the cash dispenser 18, for example. It should be apparent that the application programs installed in an unattended system, such as at the ATM 10, need to be safeguarded, especially the application programs which control operation of valuable system resources. The application programs installed at the ATM 10 are safeguarded in a manner in accordance with the present invention, as explained in detail hereinbelow.

Figure 3:
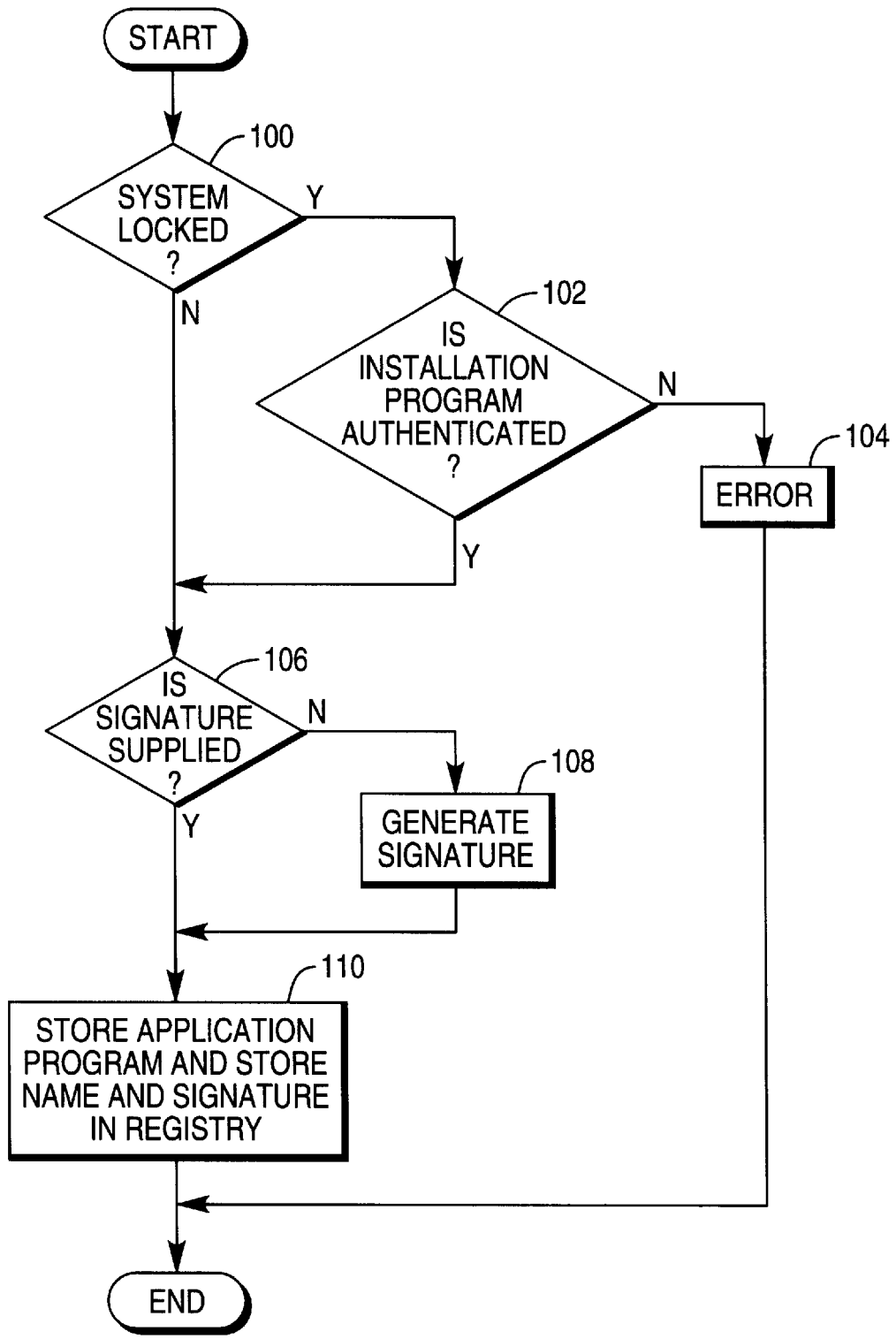
FIGS. 3–5 are flow charts depicting processes carried out at the ATM of FIG. 1.

Referring to FIG. 3, a flowchart depicts a system function which is executed to install an application program into the memory unit 34. The system function depicted in the flowchart of FIG. 3 is usually executed when a person, such as a start-up engineer, first installs application programs into the memory unit 34 of the controller unit 30 of the ATM 10. In first step 100 of FIG. 3, a determination is made as to whether the unattended system (i.e., the ATM 10) is locked. If the determination in step 100 is affirmative, the system function proceeds to step 102 to determine if the installation program has been previously authenticated. The installation program copies application programs from distribution media (such as floppy disks) onto permanent local storage media (such as hard disks). If the determination in step 102 is negative, the system function proceeds to step 104 to indicate an error. When this occurs, the installation program cannot install any application program and the system function proceeds to the end. If the determination in step 102 is affirmative, the system function proceeds to step 106. Also, if the determination in step 100 is negative, the system function proceeds directly to step 106.

In step 106, a determination is made as to whether the application program to be installed has a signature associated therewith. If the determination in step 106 is negative, then the system function proceeds to step 108 to generate a signature before proceeding to step 110. If the determination in step 106 is affirmative, the system function proceeds directly to step 110. In step 110, the application program to be installed is stored in the memory unit 34 and the name and signature of the application program are stored in the register unit 38. After step 110, installation of the application program is completed.

Figure 4:
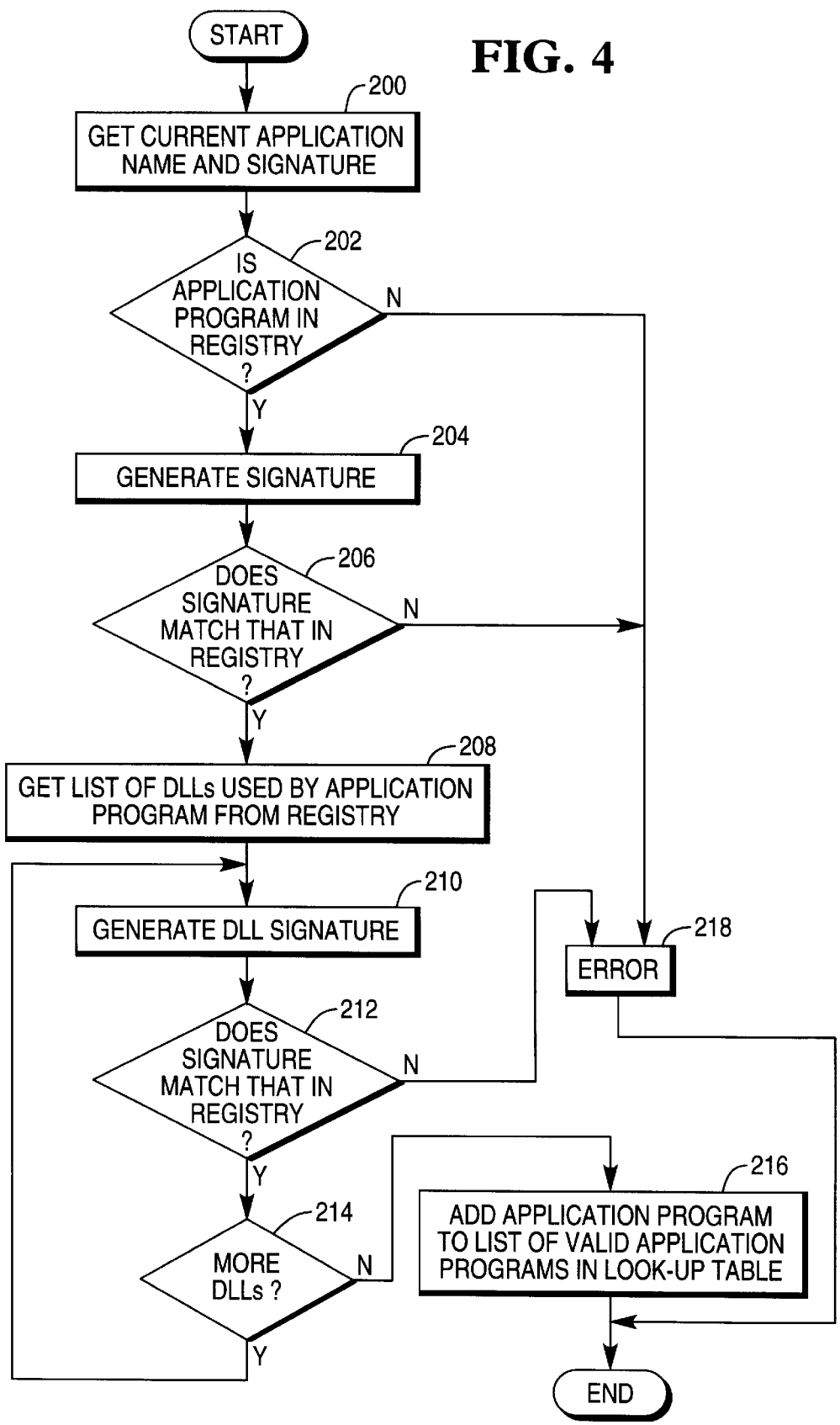

Referring to FIG. 4, a flowchart depicts a system function which is called each time an application program, which has just been installed as described hereinabove with reference to FIG. 3, is started. The application program is usually executed when a person from the financial institution which owns the ATM 10, such as an administrator, updates or performs maintenance on the ATM 10. In first step 200 of FIG. 4, the name and signature of the application program are obtained. A determination is then made in step 202 as to whether the application program is contained in a look-up table of the register unit 38. If the determination in step 202 is negative, the system function proceeds to step 218 to indicate an error and then terminates. If the determination in step 202 is affirmative, the system function proceeds to step 204 to generate a signature for the application program.

After the signature is generated in step 204, the system function proceeds to step 206 to determine whether the signature matches one of the signatures stored in the look-up table of the register unit 38. If the determination in step 206 is negative, the system function proceeds to step 218 to indicate an error and then terminates. If the determination in step 206 is affirmative, the program proceeds to step 208 to obtain a list of multiple dynamic link libraries containing files which may be accessed by the application program. This list in the form of a look-up table is obtained from the register unit 38. The system function then proceeds to step 210 to generate a signature for one of the dynamic linking libraries. In step 212, a determination is then made as to whether the signature of the dynamic linking library of step 210 matches one of the signatures contained in a look-up table of the register unit 38. If the determination in step 212 is negative, the system function proceeds to step 218 to indicate an error and then terminates. If the determination in step 212 is affirmative, the system function proceeds to step 214.

In step 214, a determination is made as to whether there is another dynamic linking library associated with the particular application program. If the determination in step 214 is affirmative, the system function returns to step 210 and repeats steps 210 and 212 until all dynamic linking libraries associated with the particular application program have been considered. The determination in step 214 is negative when all dynamic linking libraries associated with the particular application program have been considered. The system function then proceeds to step 216 to add the name and signature of the particular application program to the look-up table of the register unit 38. When this occurs, the particular application program is said to be registered or validated at the ATM 10.

Figure 5:
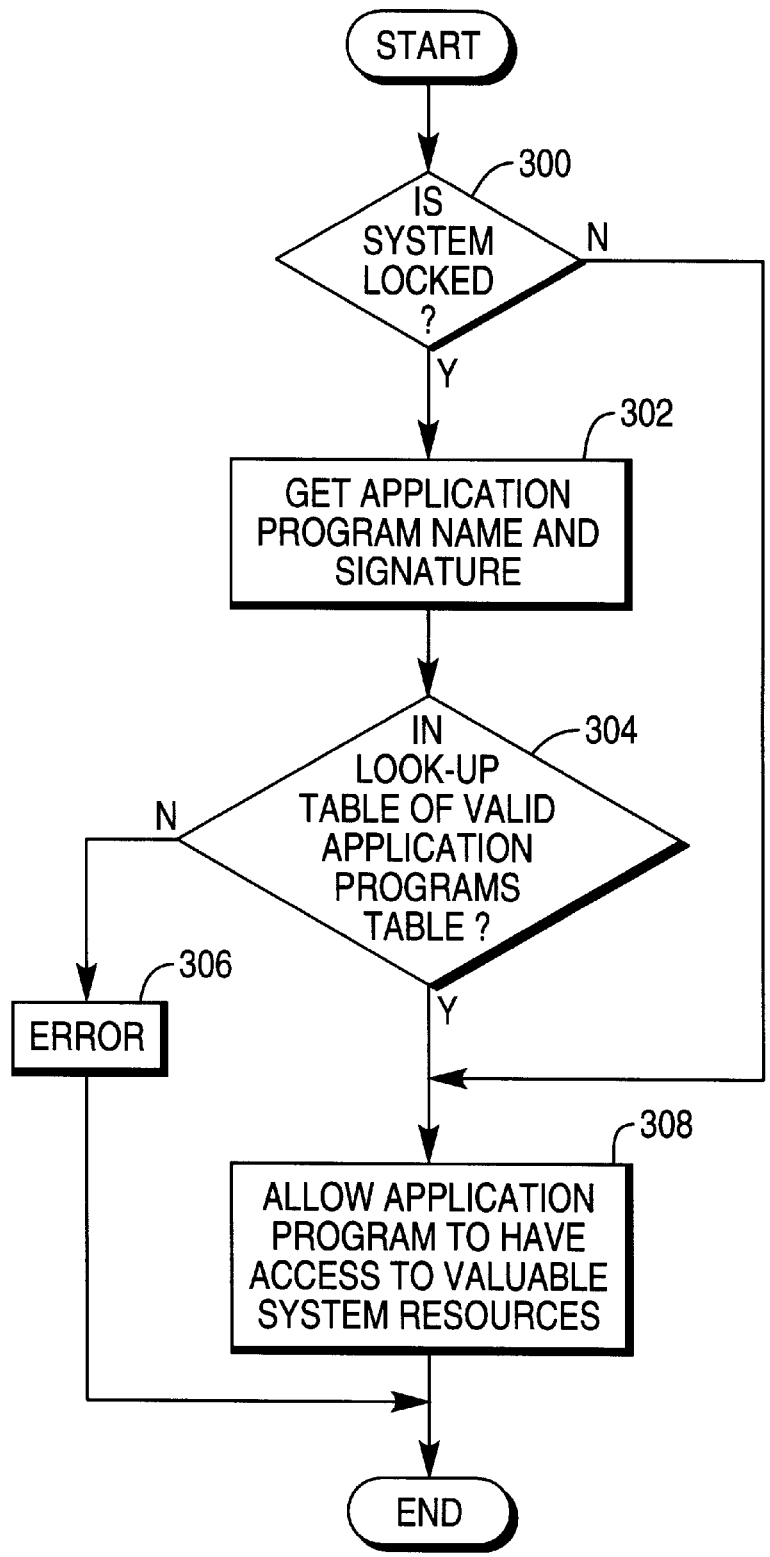

Referring to FIG. 5, a flowchart depicts a system function which is executed to authenticate an application program before the application program can control a valuable system resource, such as the cash dispenser 18, and thereby to control access of cash stored in cash dispenser 18 by the customer 24. The system function depicted in the flowchart of FIG. 5 is usually executed when the customer 24 carries out a transaction which occurs within execution of the particular application program at the ATM 10. In first step 300 of FIG. 5, a determination is made as to whether the ATM 10 is locked. If the determination in step 300 is negative, the system function proceeds to step 308 to allow the application program to have access to protected valuable system resources and thereby to allow the customer 24 to have access to valuable system resources, such as the cash dispenser 18. If the determination in step 300 is affirmative, the system function proceeds to step 302 to obtain the name and signature of the application program which requires access to the cash dispenser 18, for example. The system function then proceeds to step 304.

In step 304, a determination is made as to whether the name and signature of the application program are stored in a look-up table of the register unit 38. This look-up table contains a list of all application programs which have been registered or validated in accordance with the process described hereinabove with reference to the flowchart of FIG. 4. If the determination is negative, the system function proceeds to step 306 to indicate an error and then terminates. When this occurs, the application program and the customer 24 cannot gain access to the valuable system resource (i.e., the cash dispenser 18 in this example) controlled by the particular application program. Accordingly, the customer 24 cannot access any cash stored in the cash dispenser 18. However, if the determination in step 304 is affirmative, the system function proceeds to step 308. When this occurs, the application program is authenticated and the application program is able to control the cash dispenser 18 to thereby allow the customer 24 to access cash stored in the cash dispenser 18.

A number of advantages result by authenticating an application program installed in an unattended system, as described hereinabove. One advantage is that a mechanism is provided to prevent fraudulent transactions from occurring at the unattended system, especially fraudulent transactions involving access to valuable system resources like the cash dispenser 18 of the ATM 10 described above. A user of the ATM 10 is unable to gain access to the cash dispenser 18 until the application program which controls operation of the cash dispenser 18 has been authenticated. Another advantage is that an application program cannot be authenticated if the application program has been altered subsequent to its initial installation into the unattended system. An altered application program cannot be authenticated because the name and signature of an altered application program will not be found in the look-up table of the register unit 38 containing the list of registered or validated application programs, as described hereinabove.

From the above description of the invention, those skilled in the art to which the present invention relates will perceive improvements, changes and modifications. Numerous substitutions and modifications can be undertaken without departing from the true spirit and scope of the invention. Such improvements, changes and modifications within the skill of the art to which the present invention relates are intended to be covered by the appended claims.

What is claimed is:

1. A method of authenticating an executable application program which has a unique signature associated therewith and which has been previously installed in a memory of a self-service terminal by a non-customer of the self-service terminal, the method comprising the steps of:

(a) retrieving the unique signature of the executable application program from the memory of the self-service terminal when a customer of the self-service terminal requests a desired self-service transaction to be carried out;

(b) comparing the unique signature retrieved in step (a) with a number of signatures stored in a look-up table to determine if the unique signature matches one of the signatures stored in the look-up table; and (c) authenticating the executable application program to allow the executable application program to be executed only when a match occurs in step (b) and thereby to allow the self-service customer to complete the desired self-service transaction.

2. A method of safeguarding an executable application program which has a unique signature associated therewith and which has been previously installed in a memory of a self-service terminal by a non-customer of the self-service terminal, the method comprising the steps of:

(a) retrieving the unique signature of the executable application program from the memory of the self-service terminal when a customer of the self-service terminal requests a desired self-service transaction to be carried out;

(b) comparing the unique signature retrieved in step (a) with a number of signatures stored in a look-up table to determine if the unique signature matches one of the signatures stored in the look-up table;

(c) allowing the executable application program to be executed when a match is found in step (b) to allow the self-service customer to complete the desired self-service transaction; and (d) disallowing the executable application program to be executed when a match is unable to be found in step (b) to prevent the self-service customer from completing the desired self-service transaction.

3. A self-service terminal comprising:

a register storing a number of signatures associated with a number of executable application programs;

a memory storing an executable application program which has a unique signature associated therewith and which has been previously installed in the memory by a non-customer of the self-service terminal;

means for retrieving the unique signature of the executable application program from the memory when a customer of the self-service terminal requests a desired self-service transaction to be carried out;

means for comparing the retrieved unique signature with the signatures stored in the register to determine if the retrieved unique signature matches one of the signatures stored in the register; and means for authenticating the executable application program to allow the executable application program to be executed only when the retrieved unique signature matches one of the signatures stored in the register and thereby to allow the self-service customer to complete the desired self-service transaction.

4. A self-service terminal comprising:

a register storing a number of signatures associated with a number of executable application programs;

a memory storing an executable application program which has a unique signature associated therewith and which has been previously installed in the memory by a non-customer of the self-service terminal;

means for retrieving the unique signature of the executable application program from the memory when a customer of the self-service terminal requests a desired self-service transaction to be carried out;

means for comparing the retrieved unique signature with the signatures stored in the register to determine if the retrieved unique signature matches one of the signatures stored in the register;

means for allowing the executable application program to be executed when the retrieved unique signature matches one of the signatures stored in the register to allow the self-service customer to complete the desired self-service transaction; and means for disallowing the executable application program to be executed when the retrieved unique signature is unable to be matched with any one of the signatures stored in the register to prevent the self-service customer from completing the desired self-service transaction.

5. A self-service terminal for enabling a self-service customer to carry out a desired self-service transaction, the self-service terminal comprising:

a user interface for accepting a request from the self-service customer that the desired self-service transaction be carried out;

a register unit for storing a number of signatures associated with a number of executable application programs;

a memory unit for storing an executable application program which has been previously installed by a non-customer of the self-service terminal and which, when executed, allows the self-service customer to complete the desired self-service transaction; and a processing unit for executing the executable application program stored in the memory unit, the processing unit including (i) means for retrieving from the memory unit a unique signature associated with the executable application program, (ii) means for comparing the unique signature associated with the executable application program with the signatures stored in the register unit, and (iii) means for authenticating the application program to allow the executable application program to be executed only when the unique signature associated with executable application program matches one of the signatures stored in the register unit and thereby to allow the self-service customer to complete the desired self-service transaction.

6. A self-service terminal according to claim 5, wherein the memory unit and the register unit comprise separate storage media.

7. A self-service terminal according to claim 5, wherein the user interface comprises a front panel of an automated teller machine (ATM) to allow an ATM customer to carry out a desired self-service financial transaction.

8. A self-service terminal according to claim 7, wherein the front panel of the ATM includes (i) means for verifying the identity of the ATM customer, and (ii) means for allowing the ATM customer to input data to complete the desired self-service financial transaction after the identity of the ATM customer has been verified.

* * * * *